United States Patent
Dutta et al.

(10) Patent No.: US 10,541,556 B2
(45) Date of Patent: Jan. 21, 2020

(54) SYSTEM AND APPROACH TO INTEGRATE AND MANAGE DIVERSE DEMAND RESPONSE SPECIFICATIONS FOR MULTI-SITE ENTERPRISES

(71) Applicant: Honeywell International Inc., Morris Plains, NJ (US)

(72) Inventors: Ripunjeet Dutta, Bangalore (IN); Prabhat Ranjan, Bangalore (IN); Rob Warner, Newburyport, MA (US); Barnali Chetia, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 173 days.

(21) Appl. No.: 15/499,845

(22) Filed: Apr. 27, 2017

(65) Prior Publication Data
US 2018/0316221 A1    Nov. 1, 2018

(51) Int. Cl.
*H02J 13/00* (2006.01)
*G06F 9/54* (2006.01)
(Continued)

(52) U.S. Cl.
CPC ............ *H02J 13/0062* (2013.01); *G06F 9/54* (2013.01); *G06Q 40/04* (2013.01); *G06Q 50/06* (2013.01); *G05B 19/042* (2013.01)

(58) Field of Classification Search
CPC ............... H02J 13/0062; G05B 19/042; G05B 2219/2642; G06Q 50/06; G06Q 40/04; G06F 9/54
See application file for complete search history.

(56) References Cited

U.S. PATENT DOCUMENTS 4,110,827 A    8/1978   Shavit
4,130,874 A    12/1978  Pai
(Continued)

FOREIGN PATENT DOCUMENTS

EP    2456227 A2    5/2012
JP    2012118982 A   6/2012
(Continued)

OTHER PUBLICATIONS

Sotiris Papantoniou, Dionysia Kolokotsa, Kostas Kalaitzakis, "Building optimization and control algorithms implemented in existing BEMS using a web based energy management and control system," Energy and Buildings, vol. 98, pp. 45-55, 2015.*

(Continued)

*Primary Examiner* — Christopher E. Everett
(74) *Attorney, Agent, or Firm* — Seager, Tufte & Wickhem LLP

(57) ABSTRACT

A demand response system incorporating an enterprise demand manager (EDM), and a universal demand response gateway (UDG). The EDM may provide a single unified web interface. It may provide a cloud application that allows an operator of an enterprise to create and send load/energy reduction requests to buildings of one or more groups of buildings in the enterprise. The cloud application may provide controls to the buildings based on market conditions, dispatch demand response (DR) events to the buildings, and provide feedback to confirm that requested reductions are occurring in the buildings. The DR events may include the buildings in an energy market, a load/energy reduction intensity level, and a target load/energy reduction amount for each building. The UDG may perform as a gateway between various DR automation servers (DRAS's) and multiple supervisor controllers at the buildings.

11 Claims, 3 Drawing Sheets

(51) Int. Cl.
  *G06Q 50/06* (2012.01)
  *G06Q 40/04* (2012.01)
  *G05B 19/042* (2006.01)

(56) References Cited

U.S. PATENT DOCUMENTS

| | | |
|---|---|---|
| 4,153,936 A | 5/1979 | Schmitz et al. |
| 4,419,667 A | 12/1983 | Gurr et al. |
| 4,549,274 A | 10/1985 | Lerner et al. |
| 4,850,010 A | 7/1989 | Stanbury et al. |
| 4,937,760 A | 6/1990 | Beitel et al. |
| 5,319,781 A | 6/1994 | Syswerda |
| 5,341,142 A | 8/1994 | Reis et al. |
| 5,500,561 A | 3/1996 | Wilhelm |
| 5,566,084 A | 10/1996 | Cmar |
| 5,572,438 A | 11/1996 | Ehlers et al. |
| 5,598,349 A | 1/1997 | Elliason et al. |
| 5,719,854 A | 2/1998 | Choudhury et al. |
| 5,822,553 A | 10/1998 | Gifford et al. |
| 5,892,758 A | 4/1999 | Argyroudis |
| 6,026,375 A | 2/2000 | Hall et al. |
| 6,195,367 B1 | 2/2001 | Jakobik et al. |
| 6,209,018 B1 | 3/2001 | Ben-Shachar et al. |
| 6,252,950 B1 | 6/2001 | Duty et al. |
| 6,259,723 B1 | 7/2001 | Miyashita |
| 6,278,717 B1 | 8/2001 | Arsenault et al. |
| 6,289,384 B1 | 9/2001 | Whipple et al. |
| 6,366,926 B1 | 4/2002 | Pohlmann et al. |
| 6,446,136 B1 | 9/2002 | Pohlmann et al. |
| 6,519,509 B1 | 2/2003 | Nierlich et al. |
| 6,529,723 B1 | 3/2003 | Bentley |
| 6,535,817 B1 | 3/2003 | Krishnamurti |
| 6,566,926 B1 | 5/2003 | Patterson |
| 6,574,581 B1 | 6/2003 | Bohrer et al. |
| 6,758,161 B2 | 7/2004 | Nohynek |
| 6,832,134 B2 | 12/2004 | Havlena |
| 6,832,249 B2 | 12/2004 | Ciscon et al. |
| 6,857,022 B1 | 2/2005 | Scanlan |
| 6,858,953 B2 | 2/2005 | Stahlkopf |
| 6,865,685 B2 | 3/2005 | Hammond et al. |
| 6,985,087 B2 | 1/2006 | Soliman |
| 7,010,700 B1 | 3/2006 | Foss et al. |
| 7,016,784 B2 | 3/2006 | Allen et al. |
| 7,039,532 B2 | 5/2006 | Hunter |
| 7,069,309 B1 | 6/2006 | Dodrill et al. |
| 7,183,910 B2 | 2/2007 | Alvarez et al. |
| 7,236,908 B2 | 6/2007 | Timko et al. |
| 7,260,616 B1 | 8/2007 | Cook |
| 7,333,880 B2 | 2/2008 | Brewster et al. |
| 7,337,237 B2 | 2/2008 | Salashoor et al. |
| 7,346,467 B2 | 3/2008 | Bohrer et al. |
| 7,392,115 B2 | 6/2008 | Schindler |
| 7,401,086 B2 | 7/2008 | Chorafakis et al. |
| 7,472,301 B2 | 12/2008 | Ginggen et al. |
| 7,528,503 B2 | 5/2009 | Rognli et al. |
| 7,565,227 B2 | 7/2009 | Richard et al. |
| 7,590,746 B2 | 9/2009 | Slater |
| 7,650,789 B2 | 1/2010 | Portzgen et al. |
| 7,676,657 B2 | 3/2010 | Lindholm et al. |
| 7,702,424 B2 | 4/2010 | Cannon et al. |
| 7,715,951 B2 | 5/2010 | Forbes, Jr. et al. |
| 7,742,953 B2 | 6/2010 | King et al. |
| 7,775,191 B2 | 8/2010 | Hou |
| 7,778,738 B2 | 8/2010 | Taft |
| 7,797,009 B2 | 9/2010 | Kiiskila et al. |
| 7,806,845 B2 | 10/2010 | Arm et al. |
| 7,844,481 B2 | 11/2010 | Hilbush et al. |
| 7,845,576 B2 | 12/2010 | Siddaramanna et al. |
| 7,865,252 B2 | 1/2011 | Clayton |
| 7,873,441 B2 | 1/2011 | Synesiou et al. |
| 7,885,718 B2 | 2/2011 | Yano et al. |
| 7,886,166 B2 | 2/2011 | Shnekendorf et al. |
| 7,925,384 B2 | 4/2011 | Huizenga et al. |
| 7,941,528 B2 | 5/2011 | Hicks, III et al. |
| 7,954,726 B2 | 6/2011 | Siddaramanna et al. |
| 7,958,229 B2 | 6/2011 | Conway |
| 8,000,913 B2 | 8/2011 | Kreiss et al. |
| 8,023,410 B2 | 9/2011 | O'Neill |
| 8,073,558 B2 | 12/2011 | Koch et al. |
| 8,073,732 B1 | 12/2011 | Ghosh et al. |
| 8,091,794 B2 | 1/2012 | Siddaramanna et al. |
| 8,140,279 B2 | 3/2012 | Subbloie |
| 8,140,658 B1 | 3/2012 | Gelvin et al. |
| 8,143,811 B2 | 3/2012 | Shloush et al. |
| 8,163,276 B2 | 4/2012 | Hedrick et al. |
| 8,170,774 B2 | 5/2012 | Forte et al. |
| 8,183,995 B2 | 5/2012 | Wang et al. |
| 8,199,773 B2 | 6/2012 | Aubin et al. |
| 8,232,745 B2 | 7/2012 | Chemel et al. |
| 8,234,017 B2 | 7/2012 | Ahn |
| 8,234,876 B2 | 8/2012 | Parsonnet et al. |
| 8,260,468 B2 | 9/2012 | Ippolito et al. |
| 8,260,469 B2 | 9/2012 | Gregory et al. |
| 8,260,650 B2 | 9/2012 | Miller |
| 8,280,656 B2 | 10/2012 | Kreiss et al. |
| 8,291,243 B2 | 10/2012 | Castelli et al. |
| 8,295,989 B2 | 10/2012 | Rettger et al. |
| 8,305,380 B2 | 11/2012 | Gotwalt et al. |
| 8,312,299 B2 | 11/2012 | Tremel et al. |
| 8,321,302 B2 | 11/2012 | Bauer et al. |
| 8,321,950 B2 | 11/2012 | Oran |
| 8,327,024 B2 | 12/2012 | Pattinson et al. |
| 8,330,762 B2 | 12/2012 | Grossman |
| 8,352,094 B2 | 1/2013 | Johnson et al. |
| 8,363,609 B2 | 1/2013 | Zhang |
| 8,364,287 B2 | 1/2013 | Pearson et al. |
| 8,373,547 B2 | 2/2013 | Benya et al. |
| 8,374,903 B2 | 2/2013 | Little |
| 8,386,086 B2 | 2/2013 | Roux et al. |
| 8,406,937 B2 | 3/2013 | Veifuerth et al. |
| 8,412,654 B2 | 4/2013 | Montalvo |
| 8,417,391 B1 | 4/2013 | Rombouts et al. |
| 8,443,355 B2 | 5/2013 | Wiese et al. |
| 8,489,063 B2 | 7/2013 | Petite |
| 8,509,953 B2 | 8/2013 | Taft |
| 8,523,084 B2 | 9/2013 | Siddaramanna et al. |
| 8,538,593 B2 | 9/2013 | Sun et al. |
| 8,543,247 B2 | 9/2013 | Boss et al. |
| 8,565,903 B2 | 10/2013 | Koch et al. |
| 8,572,230 B2 | 10/2013 | Koch |
| 8,589,112 B2 | 11/2013 | Tsypin et al. |
| 8,595,094 B1 | 11/2013 | Forbes, Jr. |
| 8,600,556 B2 | 12/2013 | Nesler et al. |
| 8,600,571 B2 | 12/2013 | Dillon et al. |
| 8,606,418 B1 | 12/2013 | Myers et al. |
| 8,620,634 B2 | 12/2013 | Foslien Graber et al. |
| 8,621,097 B2 | 12/2013 | Venkatakrishnan et al. |
| 8,626,354 B2 | 1/2014 | Walter et al. |
| 8,630,744 B2 | 1/2014 | Walter et al. |
| 8,639,214 B1 | 1/2014 | Fujisaki |
| 8,667,132 B2 | 3/2014 | Koch |
| 8,671,167 B2 | 3/2014 | Koch |
| 8,671,191 B2 | 3/2014 | Koch |
| 8,676,273 B1 | 3/2014 | Fujisaki |
| 8,676,953 B2 | 3/2014 | Koch |
| 8,700,187 B2 | 4/2014 | Forbes, Jr. |
| 8,706,650 B2 | 4/2014 | Ozog |
| 8,738,190 B2 | 5/2014 | Pai et al. |
| 8,744,638 B2 | 6/2014 | Tyagi et al. |
| 8,751,435 B2 | 6/2014 | Sriharan et al. |
| 8,782,190 B2 | 7/2014 | Koch |
| 8,849,471 B2 | 9/2014 | Daniel et al. |
| 8,868,925 B2 | 10/2014 | Wyatt et al. |
| 8,870,086 B2 | 10/2014 | Tessier et al. |
| 8,879,488 B2 | 11/2014 | Pavlovski et al. |
| 8,880,226 B2 | 11/2014 | Raman et al. |
| 8,880,235 B2 | 11/2014 | Greene et al. |
| 9,033,255 B2 | 5/2015 | Tessier et al. |
| 9,088,179 B2 | 7/2015 | Shaffer et al. |
| 9,124,535 B2 | 9/2015 | Koch |
| 9,137,050 B2 | 9/2015 | Koch |
| 9,153,001 B2 | 10/2015 | Walter et al. |
| 9,183,522 B2 | 11/2015 | Koch |
| 9,406,036 B2 | 8/2016 | Kaufman et al. |

(56) References Cited

U.S. PATENT DOCUMENTS

| | | | |
|---|---|---|---|
| 9,530,169 B2 | 12/2016 | Strelec et al. | |
| 9,680,308 B2 | 6/2017 | Bruschi et al. | |
| 9,805,325 B2 | 10/2017 | Ippolito et al. | |
| 2002/0143669 A1 | 10/2002 | Scheer | |
| 2003/0016237 A1 | 1/2003 | Hickey | |
| 2003/0033230 A1 | 2/2003 | McCall | |
| 2003/0036810 A1* | 2/2003 | Petite | H02J 3/14 700/9 |
| 2003/0036822 A1* | 2/2003 | Davis | H02J 3/14 700/295 |
| 2003/0069752 A1 | 4/2003 | LeDain et al. | |
| 2003/0233201 A1 | 12/2003 | Horst et al. | |
| 2004/0034484 A1 | 2/2004 | Solomita, Jr. et al. | |
| 2004/0137897 A1 | 7/2004 | Teixeira | |
| 2004/0203649 A1 | 10/2004 | Cashiola | |
| 2005/0027636 A1 | 2/2005 | Gilbert et al. | |
| 2005/0152694 A1 | 7/2005 | Chown | |
| 2005/0172304 A1 | 8/2005 | Tavares et al. | |
| 2005/0194456 A1 | 9/2005 | Tessier et al. | |
| 2005/0229220 A1 | 10/2005 | Fischer et al. | |
| 2005/0262026 A1 | 11/2005 | Watkins | |
| 2007/0005195 A1 | 1/2007 | Pasquale et al. | |
| 2007/0043478 A1* | 2/2007 | Ehlers | F24F 11/30 700/276 |
| 2007/0055999 A1 | 3/2007 | Radom et al. | |
| 2007/0124109 A1 | 5/2007 | Timko et al. | |
| 2007/0222295 A1 | 9/2007 | Wareham et al. | |
| 2008/0046715 A1 | 2/2008 | Balaza et al. | |
| 2008/0114638 A1 | 5/2008 | Colliau et al. | |
| 2008/0167931 A1 | 7/2008 | Gerstemeier et al. | |
| 2008/0177678 A1 | 7/2008 | Di Martini et al. | |
| 2008/0195255 A1 | 8/2008 | Lutze et al. | |
| 2008/0255760 A1 | 10/2008 | Rojicek et al. | |
| 2008/0262848 A1 | 10/2008 | Shienbrood et al. | |
| 2009/0027932 A1 | 1/2009 | Haines et al. | |
| 2009/0046625 A1 | 2/2009 | Diener et al. | |
| 2009/0048718 A1* | 2/2009 | Richard | G06Q 10/06312 700/296 |
| 2009/0187499 A1 | 7/2009 | Mulder et al. | |
| 2009/0204977 A1 | 8/2009 | Tavares et al. | |
| 2009/0249090 A1 | 10/2009 | Schmitz et al. | |
| 2009/0271255 A1 | 10/2009 | Utter et al. | |
| 2009/0295594 A1 | 12/2009 | Yoon | |
| 2009/0297488 A1 | 12/2009 | Fraser et al. | |
| 2009/0313083 A1 | 12/2009 | Dillon et al. | |
| 2009/0319310 A1 | 12/2009 | Little | |
| 2010/0057480 A1 | 3/2010 | Arfin et al. | |
| 2010/0076835 A1 | 3/2010 | Silverman | |
| 2010/0106342 A1 | 4/2010 | Ko et al. | |
| 2010/0106543 A1 | 4/2010 | Marti | |
| 2010/0114340 A1 | 5/2010 | Huizenga et al. | |
| 2010/0138066 A1 | 6/2010 | Kong | |
| 2010/0138363 A1 | 6/2010 | Batterby et al. | |
| 2010/0145534 A1* | 6/2010 | Forbes, Jr. | G06Q 10/00 700/291 |
| 2010/0179704 A1 | 7/2010 | Ozog | |
| 2010/0241285 A1 | 9/2010 | Johnson et al. | |
| 2010/0332275 A1 | 12/2010 | Walsh et al. | |
| 2011/0040666 A1 | 2/2011 | Crabtree et al. | |
| 2011/0046805 A1 | 2/2011 | Bedros et al. | |
| 2011/0093493 A1 | 4/2011 | Nair et al. | |
| 2011/0113068 A1 | 5/2011 | Ouyang | |
| 2011/0196539 A1 | 8/2011 | Nair et al. | |
| 2011/0196546 A1 | 8/2011 | Muller et al. | |
| 2011/0231320 A1* | 9/2011 | Irving | G06Q 30/00 705/80 |
| 2011/0258049 A1 | 10/2011 | Ramer et al. | |
| 2011/0270454 A1 | 11/2011 | Kreiss et al. | |
| 2011/0301774 A1 | 12/2011 | Koch | |
| 2012/0066397 A1 | 3/2012 | Koch et al. | |
| 2012/0066686 A1 | 3/2012 | Koch | |
| 2012/0078687 A1 | 3/2012 | Ghosh et al. | |
| 2012/0083930 A1* | 4/2012 | Ilic | G06Q 30/06 700/287 |
| 2012/0084696 A1 | 4/2012 | Marti | |
| 2012/0093141 A1 | 4/2012 | Imes et al. | |
| 2012/0101653 A1 | 4/2012 | Tran | |
| 2012/0109399 A1 | 5/2012 | Tran | |
| 2012/0136915 A1 | 5/2012 | Koch et al. | |
| 2012/0173030 A1 | 7/2012 | Taft | |
| 2012/0197456 A1 | 8/2012 | Walter et al. | |
| 2012/0197457 A1 | 8/2012 | Walter et al. | |
| 2012/0197458 A1 | 8/2012 | Walter et al. | |
| 2012/0239218 A1* | 9/2012 | Forbes, Jr. | G01D 4/004 700/295 |
| 2012/0245968 A1 | 9/2012 | Beaulieu et al. | |
| 2012/0271473 A1 | 10/2012 | Koch | |
| 2012/0277920 A1 | 11/2012 | Koch | |
| 2012/0310431 A1 | 12/2012 | Cheetham et al. | |
| 2012/0323393 A1* | 12/2012 | Imhof | G05B 15/02 700/297 |
| 2013/0035992 A1 | 2/2013 | Silverman | |
| 2013/0047010 A1 | 2/2013 | Massey et al. | |
| 2013/0079931 A1 | 3/2013 | Wanchoo et al. | |
| 2013/0109410 A1* | 5/2013 | Meyerhofer | H04L 67/22 455/456.3 |
| 2013/0110299 A1* | 5/2013 | Meyerhofer | G06Q 10/04 700/291 |
| 2013/0110970 A1 | 5/2013 | Wanchoo et al. | |
| 2013/0123996 A1 | 5/2013 | Matos | |
| 2013/0144451 A1 | 6/2013 | Kumar et al. | |
| 2013/0166211 A1 | 6/2013 | Kerrigan et al. | |
| 2013/0173243 A1 | 7/2013 | Kayton et al. | |
| 2013/0184892 A1* | 7/2013 | Mohan | G05B 15/02 700/297 |
| 2013/0254151 A1 | 9/2013 | Mohagheghi et al. | |
| 2014/0012429 A1* | 1/2014 | Dempster | G05F 5/00 700/295 |
| 2014/0067150 A1* | 3/2014 | Songkakul | G06Q 10/06312 700/297 |
| 2014/0081704 A1 | 3/2014 | Strelec et al. | |
| 2014/0122181 A1 | 5/2014 | Fisera et al. | |
| 2014/0148923 A1 | 5/2014 | Yamada et al. | |
| 2014/0149973 A1 | 5/2014 | Walter et al. | |
| 2014/0156097 A1* | 6/2014 | Nesler | G01R 21/133 700/295 |
| 2014/0277769 A1 | 9/2014 | Matsuoka et al. | |
| 2014/0277795 A1 | 9/2014 | Matsuoka et al. | |
| 2014/0278108 A1 | 9/2014 | Kerrigan et al. | |
| 2014/0278687 A1 | 9/2014 | McConky et al. | |
| 2014/0379139 A1* | 12/2014 | Dempster | H02J 3/14 700/276 |
| 2015/0018985 A1 | 1/2015 | Koch et al. | |
| 2015/0019032 A1 | 1/2015 | Koch et al. | |
| 2015/0019037 A1 | 1/2015 | Koch | |
| 2015/0019275 A1 | 1/2015 | Koch | |
| 2015/0112500 A1 | 4/2015 | Koch | |
| 2015/0134280 A1* | 5/2015 | Narayan | G06Q 10/04 702/62 |
| 2015/0170171 A1 | 6/2015 | McCurnin et al. | |
| 2015/0244306 A1 | 8/2015 | Estes | |
| 2015/0277400 A1 | 10/2015 | Koch | |
| 2015/0314701 A1 | 11/2015 | Morioka et al. | |
| 2016/0055433 A1 | 2/2016 | Koch | |
| 2016/0116513 A1 | 4/2016 | Dutta et al. | |
| 2018/0212427 A1* | 7/2018 | Niikura | G06Q 50/06 |

FOREIGN PATENT DOCUMENTS

| | | |
|---|---|---|
| WO | 2005033964 A1 | 4/2005 |
| WO | 2008027455 A2 | 3/2008 |
| WO | 2008027457 A2 | 3/2008 |
| WO | 2009006133 A1 | 1/2009 |
| WO | 2009023230 A1 | 2/2009 |
| WO | 2009027617 A1 | 3/2009 |
| WO | 2009085610 A1 | 7/2009 |
| WO | 2011008775 A2 | 1/2011 |
| WO | 2011065007 A1 | 6/2011 |
| WO | 2013025565 A1 | 2/2013 |

(56) References Cited

FOREIGN PATENT DOCUMENTS

| WO | 2013055551 A1 | 4/2013 |
|---|---|---|
| WO | 2014036408 A1 | 3/2014 |

OTHER PUBLICATIONS

Naoya Motegi et al., "Web-based enery information systems for energy management and demand resposne in commerical buildings," Lawrence Berkeley National Laboratory, LBNL-52510, Apr. 18, 2003.*
"Executive Summary," 1 page, prior to Sep. 2007.
"Smart Demand Response: A Discussion Paper," Energy Networks Association, energyuk, 44 pages, prior to Nov. 29, 2012.
Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.
Autogrid, "Austin Energy and AutoGrid Systems Collaborate on Standards-Based Automated Demand Response to Usher in a New Era of Retail Choice for the Demand Response Market," 5 pages, Feb. 26, 2011.
Combined Search and Examination Report Under Sections 17 and 18(3) for Corresponding UK Patent Application Serial No. GB1504192.4 dated Sep. 8, 2015.
European Search Report for Related Application No. EP 12169650.4, dated Nov. 22, 2012.
International Search Report for PCT Application Serial No. pct/us2012/058537, International Filing Date Oct. 3, 2012.
Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.
Couper, "Optimizing Demand Response to Improve Economic Dispatch and Reliability," downloaded from http://public.dhe.ibm.com/common/ssi/ecm/en/euw03026usen/EUW03026USEN.PDF, 5 pages, prior to Dec. 11, 2013.
Cruz, "Tutorial on GPU Computing with an Introduction to CUDA," 37 pages, prior to Nov. 17, 2011.
Federal Energy Regulatory Commission (FERC), "Assessment of Demand Response & Advanced Metering," 92 pages, Sep. 2007.
Holmberg, "Facility Interface to the Smart Grid," National Institute of Standards and Technology, 7 pages, printed 2012.
Honeywell, "Automated Demand Response—Southern California Program," 2 pages, printed Aug. 1, 2011.
Honeywell, "The Perfect Response to Peak Events," 4 pages, Nov. 2010.
http://en.wikipedia.org/wiki/Demand_response, "Demand Response," 10 pages, printed Feb. 3, 2012.
http://www.akuacom.com/solutions/index.html, "Akuacom—Automated Demand Response," 2 pages, printed Feb. 3, 2012.
http://www.naesb.org/pdf3/dsmee012308213.doc, "Demand Response Measurement and Verification Literature Review," 29 pages, created Jan. 14, 2008, modified Dec. 18, 2012.
https://buildingsolutions.honeywell.com/Cultures/en-US/Markets/Utilities/DemandResponse/, 1 page, printed Feb. 3, 2012.
Hunt, "Automated Demand Response System and Advanced End-Use Services Platform," Optimal Technologies, 31, pages, Sep. 24, 2004.
Kiliccote et al., "Findings from Seven Years of Field Performance Data for Automated Demand Response in Commercial Buildings," Lawrence Berkeley National Laboratory, Report No. LBNL-3643E, May 2010.
Kiliccote et al., "Open Automated Demand Response Communications in Demand Response for Wholesale Ancillary Services," Lawrence Berkeley National Laboratory, Report No. LBNL-2945E, 13 pages, Nov. 2009.
Kiliccote et al., "Open Automated Demand Response for Small Commercial Buildings," Lawrence Berkeley National Laboratory, Report No. LBNL-2195E, 104 pages, Jul. 2009.
Koch et al., "Architecture Concepts and Technical Issues for an Open, Interoperable Automated Demand Response Infrastructure," Berkeley National Laboratory, Report No. LBNL-63664, 7 pages, Oct. 2007.
Koch et al., "Direct Versus Facility Centric Load Control for Automated Demand Response," Lawrence Berkeley National Laboratory, Report No. LBNL-2905E, 11 pages, Nov. 2009.
Koch et al., "Scenarios for Consuming Standardized Automated Demand Response Signals," Lawrence Berkeley National Laboratory, Report No. LBNL-1362E, 10 pages, Nov. 2008.
Koch, "The Demand Response Automation Server (DRAS)," Building Performance, http://www.akuacom.com/assets/pdf/ASHRAE_2008_Ed_Koch.pdf, 18 pages, prior to Nov. 17, 2011.
Lau et al., "Strategy and Modeling for Building DR Optimization," IEEE Smart Grid Comm, pp. 381-386, 2011.
Olson, "New Approaches in Automating and Optimizing Demand Response to Solve Peak Load Management Problems," Building IQ brochure, 8 pages, 2011.
Piette et al., "Automated Critical Peak Pricing Field Tests: 2006 Pilot Program Description and Results," Berkeley National Laboratory, Report No. LBNL-62218, 67 pages, Aug. 2007.
Piette et al., "Automated Critical Peak Pricing Field Tests: Program Description and Results," Lawrence Berkeley National Laboratory, Report No. LBNL-59351, Apr. 2006.
Piette et al., "Design and Implementation of an Open, Interoperable Automated Demand Response Infrastructure," Berkeley National Laboratory, Report No. LBNL-63665, 6 pages, Oct. 2007.
Piette et al., "Findings From the 2004 Fully Automated Demand Response Tests in Large Facilities," Lawrence Berkeley National Laboratory, Report No. LBNL-58178, 197 pages, Sep. 2005.
Piette et al., "Linking Continuous Energy Management and Open Automated Demand Response," Lawrence Berkeley National Laboratory, Report No. LBNL-1361E, 9 pages, Nov. 2008.
Piette et al., "Open Automated Demand Response Communications Specification," Version 1.0, CEC-500-2009-063, 214 pages, Apr. 2009.
Piette et al., "Participation through Automation: Fully Automated Critical Peak Pricing in Commercial Buildings," Berkeley National Laboratory, Report No. LBNL-60614, 14 pages, Aug. 13-18, 2006.
Santacana et al., "Getting Smart, With a Clearer Vision of Intelligent Grid, Control Emerges from Chaos," IEEE Power and Energy Magazine, pp. 41-48, Mar./Apr. 2010.
Schisler et al., "The Role of Demand Response in Ancillary Services Markets," IEEE, 3 pages, 2008.
Violette et al., "DRR Valuation and Market Analysis vol. II: Assessing the DRR Benefits and Costs," Summit Blue Consulting, 112 pages, Jan. 6, 2006.
Watson et al., "Machine to Machine (M2M) Technology in Demand Responsive Commercial Buildings," Berkeley National Laboratory, Report No. LBNL-55087, 18 pages, Aug. 2004.
Yin et al., "Auto-DR and Pre-Cooling of Buildings at Tri-City Corporate Center," Lawrence Berkeley National Laboratory, Report No. LBNL-3348, 140 pages, Nov. 2008.
Zaidi et al., "Load Recognition for Automated Demand Response in Microgrids," IEEE, pp. 2436-2439, 2010.
https://drrc.lbl.gov/openadr, "OpenADR," Berkeley Labs Demand Response Research Center, 2 pages, printed Apr. 6, 2017.
Siemens, "Demand Response Management System (DRMS), Version 25," 3 pages, Oct. 2014.
Akuacom by Honeywell, "Automated Demand Response," 2 pages, Sep. 2011.

* cited by examiner

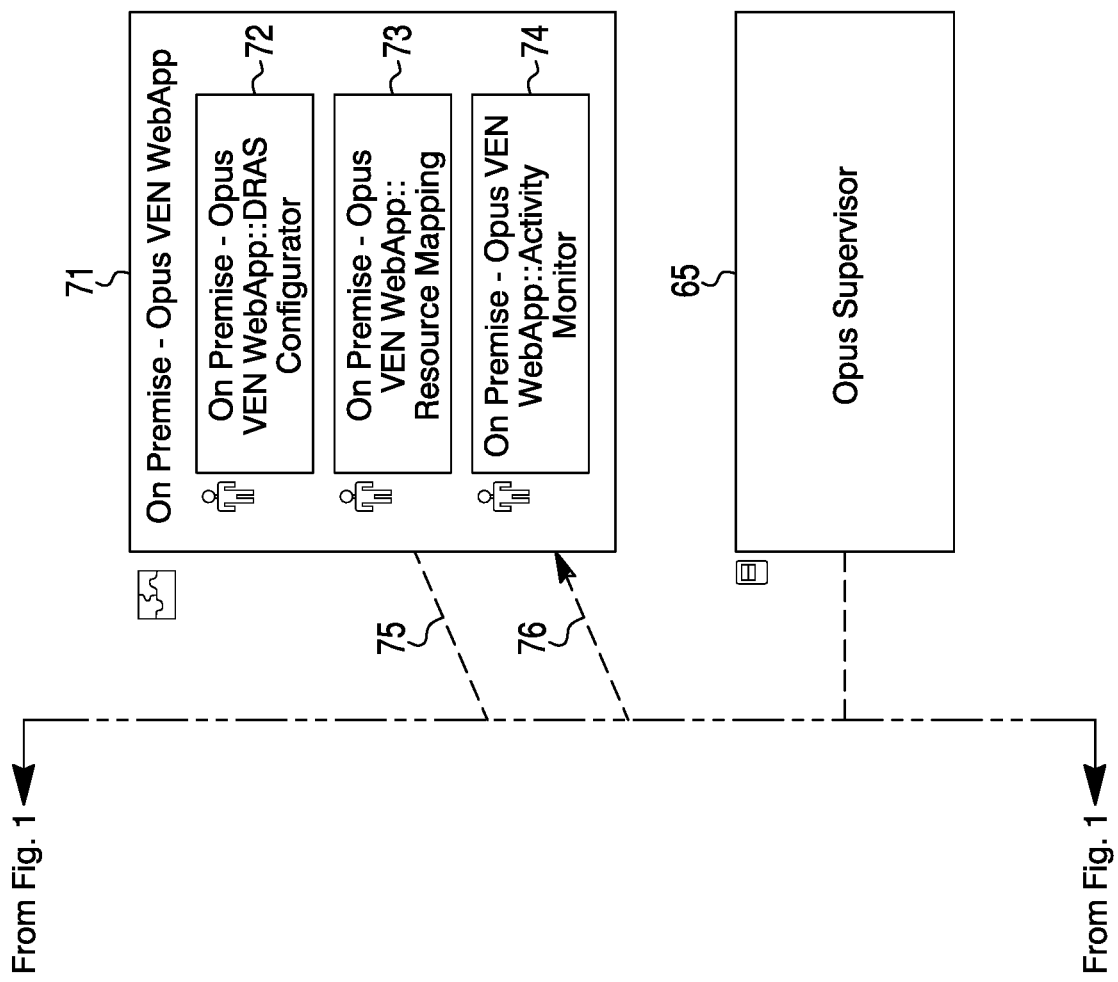

SYSTEM AND APPROACH TO INTEGRATE AND MANAGE DIVERSE DEMAND RESPONSE SPECIFICATIONS FOR MULTI-SITE ENTERPRISES

BACKGROUND

The present disclosure pertains to energy and load programs and particularly to demand response systems.

SUMMARY

The disclosure reveals a demand response system that may incorporate an enterprise demand manager (EDM), and a universal demand response gateway (UDG). The EDM may provide a single unified web interface. It may provide a cloud application that allows an operator of an enterprise to create and send load/energy reduction requests to buildings of one or more groups of buildings in the enterprise. The cloud application may provide controls to the buildings based on market conditions, dispatch demand response (DR) events to the buildings, and provide feedback to confirm that requested reductions are occurring in the buildings. The DR events may include the buildings in an energy market, a load/energy reduction intensity level, and a target load/energy reduction amount for each building. The UDG may perform as a gateway between various DR automation servers (DRAS's) and multiple supervisor controllers at the buildings.

DESCRIPTION

Figure 1:
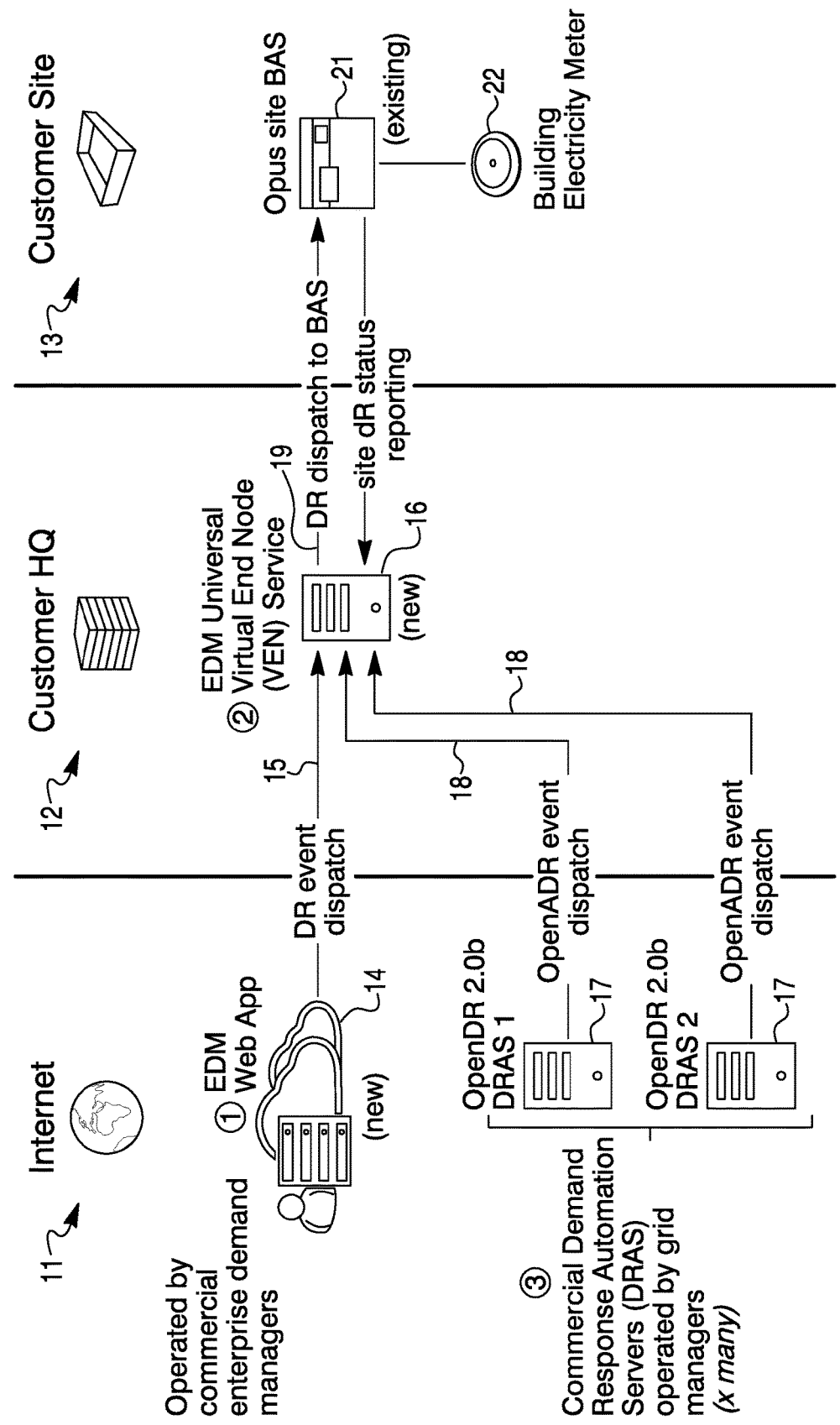
FIG. 1 is a diagram of an architecture of the present system and approach.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Grid transformation in the U.S. brought on by renewables and proliferation of connected building technologies may move the electricity marketplace to demand based pricing and also creating new demand response opportunities for grid operators and commercial customers fueled by faster response times. The result for commercial enterprises may be a strong incentive to use building automation technology to reduce electrical demand when electricity prices are high and to participate in the wider range of demand response program offerings becoming available.

Taking full advantage of emerging opportunities may require a good understanding of the market coupled with the ability to reduce an electrical load quickly in response to price fluctuations and short notification demand response requests (viz., fast demand response). Both appear difficult for large enterprises that have buildings in different electricity markets across the country. The national market appears highly fragmented making the task of identifying and acting on opportunities rather challenging. In addition, building automation technologies in the marketplace are not necessarily well equipped to provide centralized demand control for many remote buildings. The commercial enterprises need an ability to connect to aggregators supporting different protocols such as OpenADR, C Power, and so on. If a single demand response gateway/connector is not available to the enterprises, they will not necessarily be able to integrate so as to subscribe services from different aggregators in the market. This may lead to a point solution which either prevents customers or results in a very high cost and reduces flexibility.

There may be a growing need for a technology solution that will provide operators at the enterprise level with a means to easily and rapidly send electrical load reduction requests to remote buildings in response to dynamically changing conditions across many regional electricity markets; the recipient at the building may be a building automation system of some kind that can receive a load reduction request signal and take action to reduce an electrical load in the building.

The present system and approach may incorporate an enterprise demand manager (EDM) and a universal demand response gateway (UDG). The EDM may provide a single web accessible application in the cloud that will allow operators within a large enterprise to create and send load reduction requests to groups of remote buildings. The application may provide controls to allow load reduction request messages to be pre-defined and then sent as necessary based on market conditions. A load reduction request message (i.e., a demand response event) may include a group of target buildings within an electricity market, and may include a load reduction intensity level, and a target load reduction amount for each building within the group. The application may also provide controls that allow operators to easily send (i.e., dispatch) a demand response event to target buildings using a simple calendar interface, and provide feedback to confirm that requested load reductions are occurring in the buildings.

The universal demand response gateway (UDG) may be an independent cloud based on premise service which will act as a gateway between different public demand response automation servers (DRAS) and multiple supervisory controllers at remote building sites of a multi-site enterprise. The universal demand response gateway may allow the sites to be registered with a public DRAS server which will in turn allow the sites to be included in energy reduction programs. The universal demand response gateway may provide a mechanism to map supervisory controllers at the remote sites and the same resource identification (Id) may be used by DRAS while dispatching the events. The DRAS may generally be managed by third party aggregators or utilities that create and manage the energy reduction programs. When a program goes into effect, the DRAS server may signal an event message to all the site resources configured for that program. A building automation system (BAS) may receive the signal via the universal demand response gateway and may interpret the event signal and invoke energy reduction control strategies. This gateway appears unique as it may allow the integration of DRAS from different aggregators to the building sites of a multi-site enterprise.

There may be enterprise building automation solutions in the marketplace that allow operators to connect to many remote building automation systems from a central application, and can send control system parameter and schedule updates to groups of remote systems. This functionality may be used to send HVAC setpoint or schedule adjustments to remote buildings to produce electrical load reductions and facilitate participation in commercial demand response programs; however, it may be often difficult to configure and implement rapidly.

Many existing building automation technologies may also support an OpenADR automated demand response messaging scheme and may be configured to take load reduction actions upon receipt of an OpenADR load reduction request. The configuration may be often complicated, and OpenADR programs may be offered in a few regional markets making OpenADR one part of an overall enterprise demand response strategy.

EDM may take the complexity out of implementing demand control in the many regional electricity markets by providing a single unified web interface for configuration and performance feedback.

There may be a strategy which may incorporate a strong alignment to a vision of gaining a competitive advantage in the market and transforming the organization from an industrial to a digital software company, and an accelerated profitable growth. The present system and approach may fit well with corporate strategy of connected buildings, and fit well with competences and core business of a company's demand response management and meter business.

The primary high level features of the present system and approach may be noted. It may provide a set of controls to allow an operator to pre-define load reduction request groups (demand response events) that contain groups of remote buildings that will participate within specific electricity markets along with a target load reduction amount for each building.

The present system may provide a set of controls that allow an operator to dispatch a pre-defined demand response event at a scheduled time or immediately. Dispatching a demand response event may act to send load reduction requests and target load reduction amounts to the buildings included in the event. When an event is dispatched, a duration may be specified to determine how long the load reduction requests will persist at the buildings. It may provide an activity monitor that presents real-time feedback from buildings participating in demand response event dispatches. The feedback may incorporate a current building electrical load during a demand response event dispatch, and visual alerts when requested load reductions are not occurring, or the building is not communicating with the EDM.

The system may provide a load reduction history for demand response event dispatches that have occurred in the past showing the average load reductions. It may receive demand response event dispatches from the EDM web app or an OpenADR 2.0a/2.0b and/or C-Power demand response automation server. It may parse DR event dispatches from either the EDM web app or an OpenADR 2.0a/2.0b and/or C-Power DRAS and distribute to recipient remote building automation systems to initiate site demand response actions at the building. The system may communicate a dispatch receipt acknowledgement to the EDM web app or DRAS. The system may also communicate a site load and communication health status to the EDM. It may include, in the activity monitor, demand response event dispatches that have been dispatched from a third party OpenADR 2.0a/2.0b and/or C-Power demand response automation server.

The system may provide a mechanism to define remote sites that will participate in a demand response program. Participating sites may be recipients of the demand response program message when the program is dispatched to create a demand response event (i.e., broadcast to sites in the BAS enterprise). It may provide a way to organize sites that will participate in demand response programs into user defined groupings. Groupings may typically reflect the way sites will be grouped in demand response programs (e.g., energy provider/utility region), but may include other groupings like state, building prototype, and so on.

The system may provide a way to filter site lists by the groupings that they create when adding sites to a demand response program. It may provide a way to import a list of sites that will participate in demand response programs and include site groupings.

The system may provide a mechanism that will allow one to define in a demand response program the target kW levels that will be maintained at each participating site when the demand response program has been dispatched to create a demand response event. The target kW level may be maintained by the site BAS during the course of a demand response event.

The system may provide a mechanism to specify whether the program has a firm service level (FSL) kW target type, or a guaranteed load drop (GLD) kW target type. An FSL kW target may be a fixed kW value. A GLD target may be a calculated load reduction amount where the target is derived by subtracting the load reduction amount from a calculated peak kW value for each site.

The system may provide a mechanism to define the operation mode for a demand response program. The operating mode may be a part of the demand response program message sent to a site when the program is dispatched, and may be used by the site BAS to determine specific load reduction actions that will be taken to maintain the site's kW target during a demand response event. In accordance with the OpenADR 2.0 specifications, the operating mode may be normal, moderate, high or special.

The system may have a software component. A stack level may be a cloud that is a secure, scalable infrastructure for collecting, aggregating and storing data, allowing connected "things" to communicate, and making an offering/SaaS solution available, including IaaS/PaaS and data lakes.

A software type of the system may be connected or have a connectivity offering available through the cloud or a direct, or remote connection (e.g., Lyric TM thermostat, SaaS) or cover an infrastructure enabling connected services (e.g., Sentience). The system may have an IoT (Internet of Things) component.

FIG. 1 is a diagram of an architecture of the present system and approach. There may be an internet portion 11, a customer HQ portion 12 and a customer site portion 13. An enterprise demand manager (EDM) web application 14 in internet portion 11 may be operated by commercial enterprise demand managers. A demand response (DR) event dispatch 15 may be sent to an EDM universal virtual end node (VEN) service unit 16 in customer HQ portion 12.

There may be one or more commercial demand response automation servers (DRAS) 17 that are operated by grid managers. The one or more DRAS's 17 may provide open automatic demand response (ADR) event dispatches 18 to EDM universal VEN service unit 16. From dispatches 15 and 18, unit 16 may provide a DR dispatch 19 to an Opus site building automation system (BAS) 21 at customer site portion 13. BAS 21 may have a building electricity meter 22.

BAS 21 may provide a site DR status reporting signal 23 to EDM universal VEN service unit 16.

Figure 2:
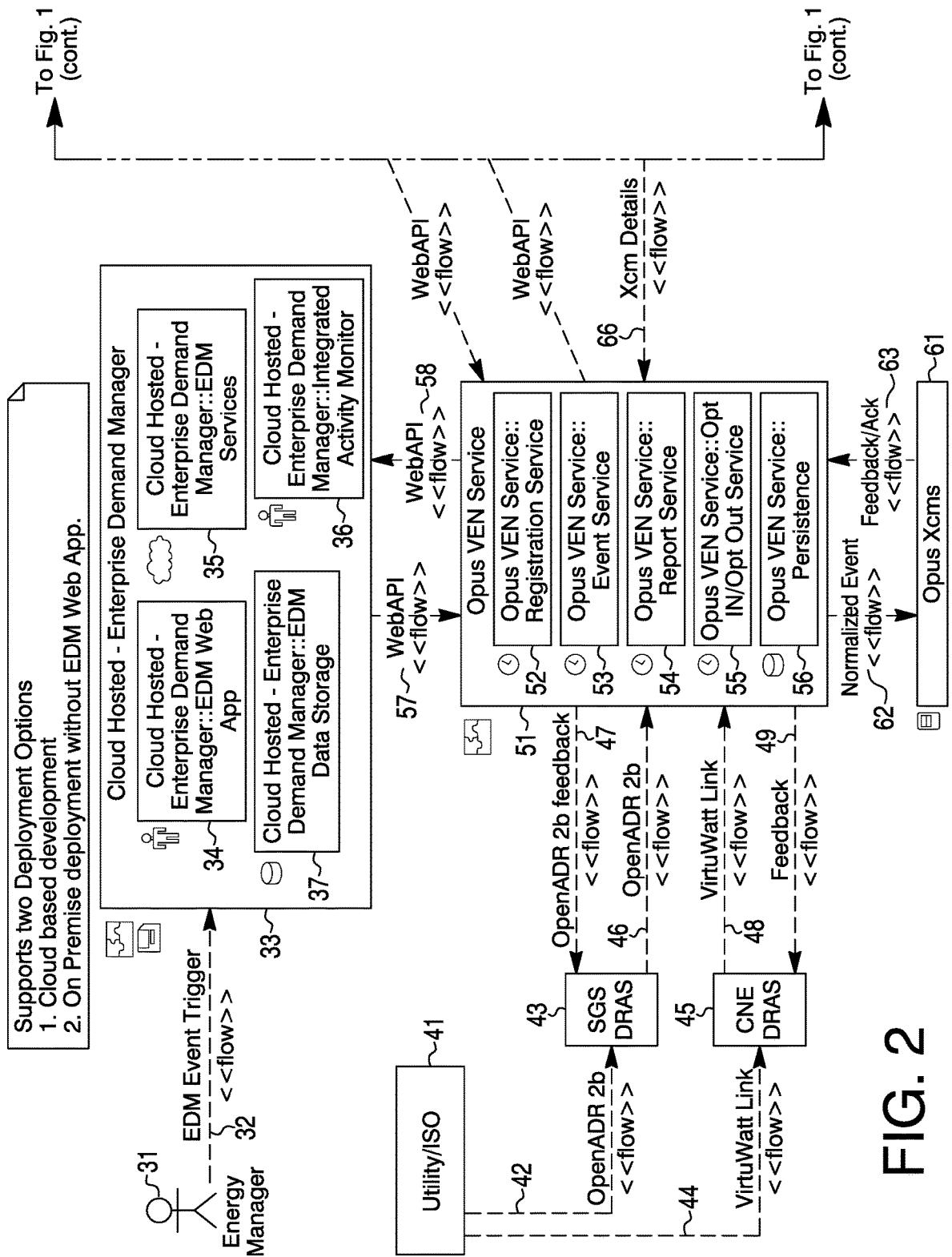
FIG. 2 is a diagram of a more detailed architecture of the present system and approach.

FIG. 2 is a diagram of a more detailed architecture of the present system and approach. The architecture may support two deployment options. One is a cloud based deployment, and the other is an on-premise deployment without an EDM web application. An energy manager 31 may be sent an EDM event trigger signal 32 to a cloud hosted EDM 33, which may incorporate an EDM web application 34, an EDM services unit 35, an integrated activity monitor 36, and an EDM data storage 37.

A utility independent service operator (ISO) 41 may provide an open ADR signal 42 to an SGS DRAS 43 and a virtual watt link signal 44 to CNE DRAS 45. SGS DRAS 43 may provide an open ADR signal 46 to an Opus VEN service unit 51. Unit 51 may send an open ADR feedback signal 47 to SGS DRAS 43. CNE DRAS 45 may provide a virtual watt link signal 48 to VEN service unit 51. Unit 51 may send a feedback signal 49 to CNE DRAS 45.

Opus VEN service unit 51 may incorporate a registration service 52, an event service 53, a report service 54, an opt in/opt out service 55, and a persistence 56. Cloud hosted EDM 33 may provide a web API signal 57 to Opus VEN service unit 51. A web API is an application programming interface (API) for either a web server or a web browser.

Unit 51 may provide a Web API signal 58 to cloud hosted EDM 33. VEN service unit 51 may send a normalized event signal 62 to Opus XCM's 61. A feedback/acknowledgement signal 63 may be sent by Opus XCM's 61 to VEN service unit 51. An Opus Supervisor 65 may send a signal 66 with XCM details to VEN service unit 51.

An on-premise Opus VEN web application unit 71 may incorporate a configurator 72, resource mapping 73, and an activity monitor 74. VEN web application unit 71 may provide a web API signal 75 to VEN service unit 51. Unit 51 may send a Web API signal 76 to web application unit 71.

To recap, a demand response (DR) system may incorporate an enterprise demand manager (EDM), and a universal demand response gateway (UDG). The EDM may provide a single unified web interface. The EDM may provide a cloud application that allows an operator of an enterprise to create and send load/energy reduction requests to buildings of one or more groups of buildings in the enterprise. The cloud application may provide controls that are predefined and sent to the buildings based on market conditions, and controls to allow an operator to dispatch a demand response (DR) event to the buildings, and provide feedback to confirm that requested reductions are occurring in the buildings. The DR event may include the buildings in an electricity market, a load/energy reduction intensity level, and a target load/energy reduction amount for each of the buildings. The UDG may perform one or more items selected from a group incorporating acting as a gateway between various DR automation servers (DRAS's) and multiple supervisor controllers at the buildings, allowing the buildings to be registered with a DRAS which permits the buildings to be included in a load/energy reduction program, providing a mechanism to map supervisory controllers at the buildings, and integrating a DRAS from different aggregators to the buildings.

The DRAS may be managed by a third-party aggregator or utility that creates and manages the energy/energy reduction program. Upon effecting of the load/energy reduction program, the DRAS may send a DR event message to the buildings programmed for the load/energy reduction program. A building automation system (BAS) may receive the DR event message via the UDG and interpret the DR event message and invoke load/energy reduction control strategies of the load/energy reduction program.

An operator may pre-define load/energy reduction request groups (DR events) that contain buildings which participate within specific electricity markets along with a target load/energy reduction amount for each building.

The system may further incorporate a set of controls that allow the operator to dispatch a pre-defined DR event at a scheduled time.

Dispatching a DR event may be to send a load/energy reduction request and load/energy reduction amounts to buildings included in the DR event. When a DR event is dispatched, a duration may be specified to determine how long the load/energy reduction requests persist at the buildings.

The load/energy reduction request may provide an activity monitor that presents real-time feedback from a building participating in DR event dispatches. The feedback may incorporate a current building electrical load during a DR event dispatch, and incorporate visual alerts when a requested load reduction fails to occur or a building lacks communication with the EDM.

DR event dispatches may be from the EDM web app, open ADR (automated demand response) or C-power DR automation server (DRAS). DR event dispatches from the EDM web app, open ADR or C-power DRAS may be parsed and distributed to recipient building automation systems of the buildings to initiate site DR actions at the buildings. Dispatch receipt acknowledgements may be sent to the EDM web app or DRAS. A site load and communication health status of the buildings may be communicated to the EDM. The site load and communication health status may incorporate an activity monitor of DR event dispatches from a third party open ADR or C-power DR automation server.

The DR system may further incorporate a mechanism to define buildings that participate in a DR program. Buildings that participate may be recipients of a DR program message when the load/energy reduction program is dispatched to create a DR event like a broadcast to the buildings.

The DR system may further incorporate a way to organize the buildings that participate in the load/energy reduction program into user defined groupings. The user defined groupings may reflect a manner that the buildings are grouped in the load/energy reduction program, which can be according to one or more categories of a group incorporating energy provider/utility regions, states, and building proto types.

The DR system may further incorporate a way to filter lists of buildings that are created when added to the load/energy reduction program, a way to import a list of buildings that participate in the load/energy reduction program, and a mechanism that allows defining, in the load/energy reduction program, target kW levels that are maintained at each building that participates in the load/energy reduction program when the load/energy reduction program has been dispatched to create a DR event. A target kW level may be maintained by a BAS of the building during a DR event.

The DR system may further incorporate a mechanism that specifies whether a load/energy reduction program has a firm service level (FSL) kW target type, or a guaranteed load drop (GLD) kW target type. An FSL target may be a fixed kW value. A GLD target may be a calculated load/energy reduction amount where a target is derived by subtracting a load/energy reduction amount from a calculated peak kW value for each building.

The system may further incorporate a mechanism to define an operation mode for a load/energy reduction program. The operation mode may be part of a DR program message sent to a building when the DR load/energy reduction program is dispatched. The operation mode may be used by a BAS of the building to determine specific energy/load reduction actions that are taken to maintain a kW target of a site during a DR event. In accordance with open ADR specifications, the operation mode may be normal, moderate, high or special.

A demand response architecture system may incorporate a mechanism that sends an enterprise demand manager (EDM) event trigger to a cloud hosted enterprise demand manager, a utility/independent service operator (ISO) that sends an open automatic demand response (ADR) signal to a first demand response automation server (DRAS) and a virtual link signal to a second DRAS, a universal virtual end mode (VEN) service mechanism that receives the open ADR signal from the first DRAS, the virtual link signal from the second DRAS, and a web application programming interface (API) signal from the cloud hosted enterprise, and one or more site controllers (XCMs) that receive a normalized event signal from the VEN service.

The architecture system may further incorporate a supervisor that sends XCM detail signals to the VEN service mechanism, and an on-premise VEN web app that sends a web API signal to the VEN service mechanism.

The first DRAS may receive an open ADR feedback signal from the VEN service mechanism. The second DRAS may receive a feedback signal from the VEN service mechanism. The one or more site controllers (XCMs) may provide a feedback/acknowledge signal to the VEN service mechanism. The VEN service mechanism may provide a web API signal to the on-premise VEN web app. The VEN service may provide a web API signal to the cloud hosted enterprise demand manager.

The cloud hosted enterprise demand manager may incorporate an EDM web app, an EDM services set, an EDM data storage, and an integrated monitor.

The VEN service mechanism may provide registration service, event service, report service, in/opt out service, and persistence.

The on-premise VEN web may incorporate a DRAS configurator, a resource mapper, and an activity monitor.

A demand response (DR) solution architecture may incorporate an internet portion, a customer headquarter portion associated with the internet portion, and a customer site portion associated with the customer headquarter portion. An enterprise demand manager (EDM) web application of the internet position may be operated by one or more enterprise demand managers to output a demand response (DR) event dispatch to an EDM universal virtual end mode (VEN) service at the customer headquarter portion. One or more DR automation servers (DRAS) may be operated by grid managers, to output an open ADR event dispatch to an EDM universal virtual end node (VEN) service.

The EDM universal virtual end node service may send a DR dispatch to a site building automation system (BAS) at the customer site portion. A building electricity meter may be connected to the site BAS. The site BAS may provide a site DR status report to the EDM universal virtual end node (VEN) service.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A demand response (DR) system comprising:
an enterprise demand manager (EDM); and
a universal demand response gateway (UDG); and
wherein:
   the EDM provides a single unified web interface;
   the EDM provides a cloud application that allows an operator of an enterprise to create and send load/energy reduction requests to buildings of one or more groups of buildings in the enterprise;
   the cloud application provides controls that are pre-defined and sent to the buildings based on market conditions, and controls to allow an operator to dispatch a demand response (DR) event to the buildings, and provide feedback to confirm that requested reductions are occurring in the buildings,
   upon dispatch of a load/energy reduction program, the DR automation server (DRAS) sends the DR event message to the buildings programmed for the load/energy reduction program; and
   a building automation system (BAS) receives the DR event message via the UDG and interprets the DR event message and invokes load/energy reduction control strategies of the load/energy reduction program;
   the DR event includes the buildings in an electricity market, a load/energy reduction intensity level, and a target load/energy reduction amount for each of the buildings; and
   the UDG performs one or more items selected from a group comprising acting as a gateway between various DR automation servers (DRAS's) and multiple supervisor controllers at the buildings, allowing the buildings to be registered with a DRAS which permits the buildings to be included in the load/energy reduction program, providing a mechanism to map supervisory controllers at the buildings, and integrating a DRAS from different aggregators to the buildings,
   wherein an operator pre-defines load/energy reduction request groups (DR events) that contain buildings which participate within specific electricity markets along with a target load/energy reduction amount for each building.

2. The DR system of claim 1, wherein:
the DRAS is managed by a third-party aggregator or utility that creates and manages the energy/energy reduction program.

3. The DR system of claim 1, further comprising a set of controls that allow the operator to dispatch a pre-defined DR event at a scheduled time.

4. The DR system of claim 1, wherein:
dispatching a DR event is to send a load/energy reduction request and load/energy reduction amounts to buildings included in the DR event; and
when a DR event is dispatched, a duration is specified to determine how long the load/energy reduction requests persist at the buildings.

5. The DR system of claim 4, wherein:
the load/energy reduction request provides an activity monitor that presents real-time feedback from a building participating in DR event dispatches; and
the feedback incorporates a current building electrical load during a DR event dispatch, and incorporates visual alerts when a requested load reduction fails to occur or a building lacks communication with the EDM.

6. The DR system of claim 1, wherein:
DR event dispatches are from the EDM web app, open ADR (automated demand response) or C-power DR automation server (DRAS);
DR event dispatches from the EDM web app, open ADR or C-power DRAS are parsed and distributed to recipient building automation systems of the buildings to initiate site DR actions at the buildings;
dispatch receipt acknowledgements are sent to the EDM web app or DRAS;
a site load and communication health status of the buildings is communicated to the EDM; and
the site load and communication health status incorporates an activity monitor of DR event dispatches from a third party open ADR or C-power DR automation server.

7. The DR system of claim 1, further comprising:
a mechanism to define buildings that participate in a DR program; and
wherein buildings that participate are recipients of a DR program message when the load/energy reduction program is dispatched to create a DR event like a broadcast to the buildings.

8. The DR system of claim 1, further comprising:
a way to organize the buildings that participate in the load/energy reduction program into user defined groupings; and
wherein the user defined groupings reflect a manner that the buildings are grouped in the load/energy reduction program, which is according to one or more categories of a group comprising energy provider/utility regions, states, and building proto types.

9. The DR system of claim 1, further comprising:
a way to filter lists of buildings that are created when added to the load/energy reduction program;
a way to import a list of buildings that participate in the load/energy reduction program; and
a mechanism that allows defining, in the load/energy reduction program, target kW levels that are maintained at each building that participates in the load/energy reduction program when the load/energy reduction program has been dispatched to create a DR event; and
wherein a target kW level is maintained by a BAS of the building during a DR event.

10. The DR system of claim 1, further comprising:
a mechanism that specifies whether a load/energy reduction program has a firm service level (FSL) kW target type, or a guaranteed load drop (GLD) kW target type; and
wherein:
an FSL target is a fixed kW value; and
a GLD target is a calculated load/energy reduction amount where a target is derived by subtracting a load/energy reduction amount from a calculated peak kW value for each building.

11. The DR system of claim 1, further comprising:
a mechanism to define an operation mode for a load/energy reduction program; and
wherein:
the operation mode is part of a DR program message sent to a building when the DR load/energy reduction program is dispatched;
the operation mode is used by a BAS of the building to determine specific energy/load reduction actions that are taken to maintain a kW target of a site during a DR event; and
in accordance with open ADR specifications, the operation mode is normal, moderate, high or special.

* * * * *